(12) United States Patent
Karasawa

(10) Patent No.: US 10,406,589 B2
(45) Date of Patent: Sep. 10, 2019

(54) APPARATUS FOR INSERTING FLATTENED TUBES INTO HEAT EXCHANGER FINS

(71) Applicant: HIDAKA SEIKI KABUSHIKI KAISHA, Tokyo (JP)

(72) Inventor: Masanao Karasawa, Tokyo (JP)

(73) Assignee: HIDAKA SEIKI KABUSHIKI KAISHA, Tokyo (JP)

( * ) Notice: Subject to any disclaimer, the term of this patent is extended or adjusted under 35 U.S.C. 154(b) by 141 days.

(21) Appl. No.: 15/562,508

(22) PCT Filed: Jul. 8, 2015

(86) PCT No.: PCT/JP2015/069582
§ 371 (c)(1),
(2) Date: Sep. 28, 2017

(87) PCT Pub. No.: WO2017/006446
PCT Pub. Date: Jan. 12, 2017

(65) Prior Publication Data
US 2018/0093321 A1 Apr. 5, 2018

(51) Int. Cl.
*B21D 53/08* (2006.01)
*B23P 15/26* (2006.01)
(Continued)

(52) U.S. Cl.
CPC .......... *B21D 53/08* (2013.01); *B21D 53/085* (2013.01); *B23P 15/26* (2013.01); *F28D 1/04* (2013.01);
(Continued)

(58) Field of Classification Search
CPC ...... B21D 53/08; B21D 53/085; B21D 53/02; B23P 19/00; B23P 19/04; B23P 19/10;
(Continued)

(56) References Cited

U.S. PATENT DOCUMENTS 4,392,524 A * 7/1983 Bauch ................. F28G 15/02
165/76
4,778,004 A 10/1988 Paulman et al.
(Continued)

FOREIGN PATENT DOCUMENTS

| JP | 1-169298 A | 7/1989 |
| JP | 2000-234883 A | 8/2000 |
| JP | 2008-183713 A | 8/2008 |
| JP | 2014-1869 A | 1/2014 |
| WO | 2016/125309 A1 | 8/2016 |

OTHER PUBLICATIONS

International Search Report, issued in PCT/JP2015/069582 (PCT/ISA/210), dated Sep. 15, 2015.

*Primary Examiner* — Sarang Afzali
(74) *Attorney, Agent, or Firm* — Birch, Stewart, Kolasch & Birch, LLP

(57) ABSTRACT

An apparatus for inserting flattened tubes into heat exchanger fins includes a guide inserted into at least one out of a plurality of cutaway portions for holding heat exchanger fins in the thickness direction. A guide holding unit holds the heat exchanger fins and the guide with a flattened tube holding unit in which flattened tubes are held in an intermittent arrangement with respect to the cutaway portions into which the guide has not been inserted. A flattened tube insertion driving unit inserts the flattened tubes held on the flattened tube holding unit into the cutaway portion with a platen that is caused to contact another edge in a width direction of the heat exchanger fins when the flattened tubes are inserted into the cutaway portions. Thereafter a compressing unit compresses the heat exchanger fins in the stacking direction.

4 Claims, 12 Drawing Sheets

FRONT VIEW    SIDE VIEW

(51) Int. Cl.
*F28D 1/04* (2006.01)
*F28F 1/12* (2006.01)
*F28F 1/32* (2006.01)

(52) U.S. Cl.
CPC .............. *F28F 1/12* (2013.01); *F28F 1/325* (2013.01); *F28F 2255/00* (2013.01); *Y10T 29/53113* (2015.01); *Y10T 29/53117* (2015.01); *Y10T 29/53122* (2015.01)

(58) Field of Classification Search
CPC ..... B23P 15/26; F28F 1/02; F28F 1/04; F28F 1/30; F28F 1/32; F28F 1/325; F28F 2215/12; F28D 1/05366; Y10T 29/53113; Y10T 29/53117; Y10T 29/53122; Y10T 29/53; Y10T 29/53039; Y10T 29/53048; Y10T 29/53061; Y10T 29/534; Y10T 29/53417; Y10T 29/4935; Y10T 29/4938
See application file for complete search history.

(56) References Cited

U.S. PATENT DOCUMENTS

| | | | | |
|---|---|---|---|---|
| 6,745,459 | B2* | 6/2004 | Tokunaga | B23P 15/26 29/726 |
| 8,789,264 | B2* | 7/2014 | Morishita | B21D 37/08 29/727 |
| 9,009,953 | B2* | 4/2015 | Ueda | B21D 53/022 29/727 |
| 9,079,277 | B2* | 7/2015 | Karasawa | B23P 15/26 |
| 9,192,978 | B2* | 11/2015 | Baba | B21D 53/022 |
| 9,259,776 | B2* | 2/2016 | Morishita | B21D 53/022 |
| 9,616,530 | B2* | 4/2017 | Kondou | F28F 1/32 |
| 9,816,761 | B2* | 11/2017 | Suzuki | B21D 53/085 |
| 9,987,673 | B2* | 6/2018 | Karasawa | B21D 28/002 |
| 2018/0243813 | A1* | 8/2018 | Karasawa | B21D 53/08 |

* cited by examiner

FRONT VIEW          SIDE VIEW

PLAN VIEW   RIGHT SIDE VIEW

PLAN VIEW

FRONT VIEW

FRONT VIEW

RIGHT SIDE VIEW

FRONT VIEW

RIGHT SIDE VIEW

FRONT VIEW

RIGHT SIDE VIEW

ENLARGEMENT OF PART A

APPARATUS FOR INSERTING FLATTENED TUBES INTO HEAT EXCHANGER FINS

TECHNICAL FIELD

The present invention relates to an apparatus for inserting flattened tubes into heat exchanger fins that inserts flattened tubes, through which a heat exchanging medium used for heat exchanging flows, into cutaway portions, a plurality of which are formed from one side in a width direction of the heat exchanger fins toward the other side, in a state where a plurality of the heat exchanger fins have been stacked.

BACKGROUND ART

The core of a heat exchanger such as an air conditioner includes tubes for circulating a heat exchanging medium and heat exchanger fins (hereinafter simply referred to as "fins") that effectively increase the surface area of the tubes. This type of heat exchanger core is manufactured by assembling tubes and fins that have been separately manufactured into an integrated structure. As an example of a manufacturing apparatus for this type of heat exchanger, the configuration disclosed in Patent Literature 1 is known.

The heat exchanger core manufacturing apparatus disclosed in Patent Literature 1 manufactures a heat exchanger core by aligning a plurality of tubes in parallel at predetermined intervals, arranging fins between the tubes, and fixing the tubes and fins to one another.

CITATION LIST

Patent Literature

Patent Literature 1: Japanese Laid-open Patent Publication No. 2008-183713

SUMMARY OF INVENTION

Technical Problem

The configuration disclosed in Patent Literature 1 has a step of aligning the flattened tubes and a step of supplying fins between the flattened tubes, and has a limit on how much the assembly efficiency can be improved.

Cutaway portions 12 for attaching flattened tubes T are formed at predetermined intervals at a plurality of positions in the length direction of heat exchanger fins 10, which are constructed of thin plates. When the flattened tubes T are inserted into the cutaway portions, as depicted in FIG. 14, a step is performed where compressing plates 126 are used to compress the heat exchanger fins 10 in the stacking direction so that the positions of the cutaway portions 12 in the respective heat exchanger fins 10 become aligned in the stacking direction.

However, by merely compressing the heat exchanger fins 10 with the compressing plates 126 that press the heat exchanger fins 10 at different spots as depicted in FIG. 14, the compressing force that acts upon the heat exchanger fins 10 will differ between parts that are directly compressed by the compressing plates 126 and parts that are not directly compressed by the compressing plates 126. This means that when flattened tubes T are inserted into the cutaway portions 12, there can be issues with some of the heat exchanger fins 10 deforming in an out-of-plane direction as depicted by the arrow Z in FIG. 15. In this way, there is a problem in that structures produced by assembling the heat exchanger fins 10 and the flattened tubes T in which deformation in the out-of-plane direction has occurred as depicted in FIG. 15 are defective.

The present invention was conceived to solve the problem described above and has an object of providing an apparatus for inserting flattened tubes into heat exchanger fins that is capable of assembling heat exchanger cores efficiently and with a high yield.

Solution to Problem

As a result of intensive research into solving the above problem, the present inventors conceived the configuration described below which is capable of solving the problem.

That is, the present invention is an apparatus for inserting flattened tubes into heat exchanger fins including: a fin stack arranging unit that arranges a fin stack composed by stacking a plurality of heat exchanger fins, in which a plurality of cutaway portions are formed in a length direction by cutting away from one side in a width direction of the heat exchanger fins toward another side, in a thickness direction of the heat exchanger fins and inserting a guide that extends in a stacking direction so as to pass through at least one of the cutaway portions of the plurality of heat exchanger fins out of the plurality of cutaway portions aligned in the length direction; a flattened tube arranging unit that has flattened tubes disposed in an intermittent arrangement with respect to the cutaway portions into which the guide has not been inserted and that is disposed on a side in the width direction of the heat exchanger fins where the cutaway portions are open; a flattened tube insertion driving unit that causes the flattened tubes and the cutaway portions to relatively approach one another so that the flattened tubes are inserted into the cutaway portions; a platen that contacts another edge in the width direction of the heat exchanger fins when the flattened tubes are inserted into the cutaway portions; a heat exchanger fin compressing unit including a compressing plate which comes into contact, on a plane that is perpendicular to the stacking direction of the heat exchanger fins, with the heat exchanger fins positioned at both ends in a stacking direction of the heat exchanger fins across an entire range in a direction on a same plane as and perpendicular to the width direction of the heat exchanger fins, and a compressing means for compressing the heat exchanger fins in the stacking direction using the pressing plate; a guide removing unit that removes the guide from the fin stack; and a flattened tube intermittently inserted fin stack arranging unit that arranges, in a flattened tube intermittently inserted fin stack that has been produced by the flattened tubes disposed in the fin stack arranging unit being inserted into the cutaway portions, positions of cutaway portions into which flattened tubes have not been inserted so as to be aligned with positions of the flattened tubes disposed in the flattened tube arranging unit, and is used in place of the flattened tube arranging unit.

It is also possible to configure an apparatus for inserting flattened tubes into heat exchanger fins including: a fin stack arranging unit that arranges a fin stack composed by stacking a plurality of heat exchanger fins, in which a plurality of cutaway portions are formed in a length direction by cutting away from one side in a width direction of the heat exchanger fins toward another side, in a thickness direction of the heat exchanger fins and inserting a guide that extends in a stacking direction so as to pass through at least one of the cutaway portions of the plurality of heat exchanger fins out of the plurality of cutaway portions aligned in the length direction; a flattened tube arranging unit that has flattened tubes disposed in an intermittent arrangement with respect to the cutaway portions into which the guide has not been inserted and that is disposed on a side in the width direction of the heat exchanger fins where the cutaway portions are open; a flattened tube insertion driving unit that causes the flattened tubes and the cutaway portions to relatively approach one another so that the flattened tubes are inserted into the cutaway portions; a platen that contacts another edge in the width direction of the heat exchanger fins when the flattened tubes are inserted into the cutaway portions; a heat exchanger fin compressing unit including a compressing plate which comes into contact, on a plane that is perpendicular to the stacking direction of the heat exchanger fins, with the heat exchanger fins positioned at both ends in a stacking direction of the heat exchanger fins across an entire range in a direction on a same plane as and perpendicular to the width direction of the heat exchanger fins, and a compressing means for compressing the heat exchanger fins in the stacking direction using the pressing plate; a guide removing unit that removes the guide from the fin stack; and a second flattened tube arranging unit that arranges, for a flattened tube intermittently inserted fin stack that is disposed on the fin stack arranging unit and has been produced by the flattened tube arranging unit, the flattened tube insertion driving unit, the compressing plate, and the guide removing unit intermittently inserting flattened tubes into the cutaway portions of the fin stack, new flattened tubes in an arrangement corresponding to positions of cutaway portions into which flattened tubes have not been inserted and that is used in place of the flattened tube arranging unit.

By using these configurations, it is possible to reliably prevent deformation in the out-of-plane direction of the heat exchanger fins when the flattened tubes are inserted into the cutaway portions, and to insert flattened tube into the cutaway portions without damaging the heat exchanger fins.

It is preferable for the compressing plate to be formed in a shape that follows an outline of a contacted surface that contacts the heat exchanger fins, and for end positions of the compressing plate on one side in the width direction of the heat exchanger fins to protrude beyond positions of openings of the cutaway portions.

By using this configuration, guide channels that become connected to the cutaway portions are formed in the compressing plate at positions that correspond to the cutaway portions. That is, since the flattened tubes are guided by the guide channels into the cutaway portions when the flattened tubes are inserted into the cutaway portions, it is possible to prevent damage and the like to the cutaway portions when the flattened tubes are inserted.

Advantageous Effects of Invention

According to the present invention, it is possible to reliably avoid deformation in the out-of-plane direction of heat exchanger fins when flattened tubes are inserted into the cutaway portions, and to insert the flattened tube into the cutaway portions without damaging the heat exchanger fins. By doing so, it is possible to perform the task of assembling heat exchanger fins with a plurality of cutaway portions and flattened tubes to be inserted into the cutaway portions with a favorable yield.

DESCRIPTION OF EMBODIMENTS

Figure 1:
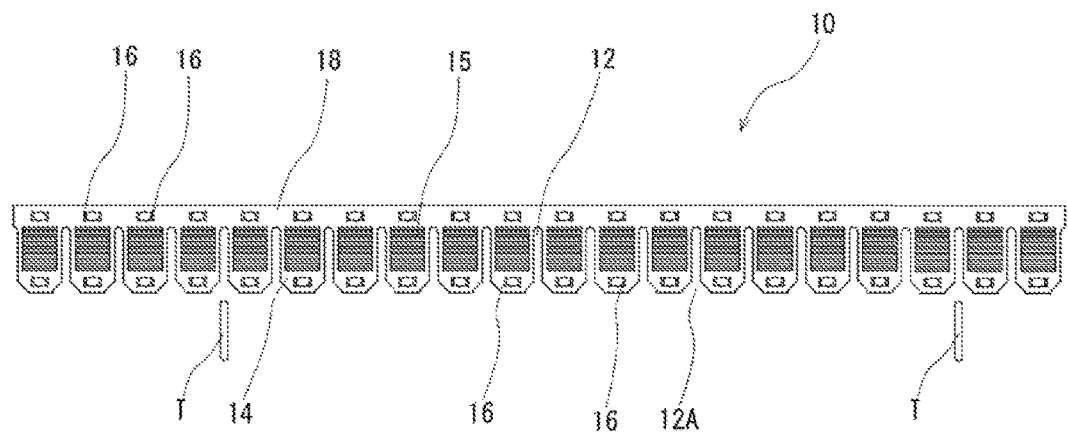
FIG. 1 is a plan view of a heat exchanger fin used in the present embodiments.

The overall manufacturing process for a heat exchanger fin 10 handled in the present embodiments will now be described. FIG. 1 is a plan view depicting an entire heat exchanger fin, and FIG. 2 is a plan view of the heat exchanger fin with a principle part in enlargement.

A heat exchanger fin 10 like that depicted in FIG. 1 is formed by press machining a thin plate of metal, such as aluminum. The thin metal plate used as a raw material of the flattened tube fin 10 is supplied in a state where the metal plate has been wound into a coil. After being fed out by a feeder, the thin metal plate is intermittently conveyed to a press apparatus by a conveying apparatus. After being machined (pressed) into a predetermined shape by a mold apparatus provided inside the press apparatus (neither apparatus is illustrated), the thin metal plate is formed into metal strips of the product width by splitting the thin metal plate into product widths. The metal strips of product width are divided into lengths of a size that is set in advance in the length direction (conveying direction) to form the heat exchanger fins 10, which are then stacked and held in a stacker apparatus, described later.

Figure 2:
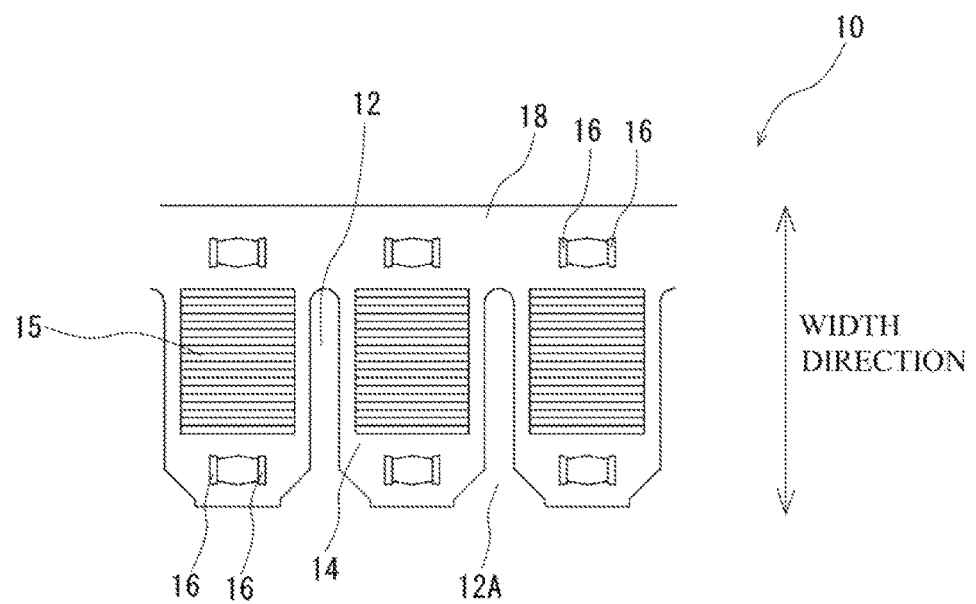
FIG. 2 is a plan view of the heat exchanger fin used in the present embodiments, with a principle part in enlargement.

As depicted in FIG. 1 and FIG. 2, cutaway portions 12, into which flattened tubes T for supplying coolant for heat exchanging are inserted, are formed in each flattened tube fin 10. The cutaway portions 12 are formed at a plurality of positions that are separated by predetermined intervals along the length direction of the heat exchanger fin 10. Plate-like portions 14 are formed between the cutaway portions 12 of the heat exchanger fin 10, and a louver 15 is formed on each plate-like portion 14. Folded-up portions 16 formed by cutting and folding up parts of the plate-like portions 14 are formed at both ends in the width direction of the louvers 15. As should be clear from FIG. 1 and FIG. 2, two folded-up portions 16 are formed for one louver 15 on each heat exchanger fin 10 according to the present embodiment.

The cutaway portions 12 are formed from only one side in the width direction of each heat exchanger fin 10. Accordingly, the plate-like portions 14 are joined in the length direction by a joining portion 18 that extends along the length direction. On the flattened tube fin 10 according to the present embodiment, out of the folded-up portions 16 for one louver 15, the folded-up portion 16 on one side is formed at the front end of a plate-like portion 14 (an opening 12A side of the cutaway portions 12) and the folded-up portion 16 on the other side is formed at a position on the joining portion 18. Note that although a state where flattened tubes T that are to advance into the cutaway portions 12 are disposed at only two positions is depicted in FIG. 1 to simplify the drawing, flattened tubes T are inserted into all of the cutaway portions 12.

Figure 3:
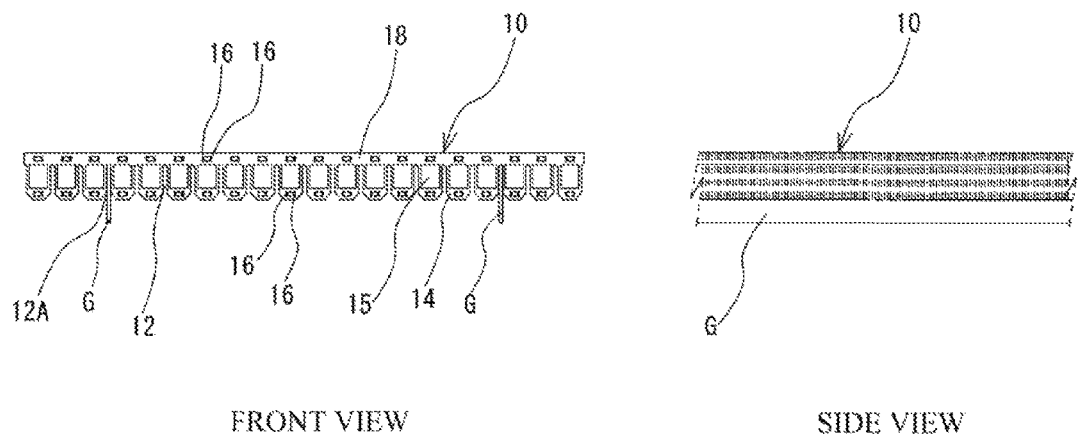
FIG. 3 is a diagram useful in explaining a state where heat exchanger fins have been stacked in a thickness direction thereof on guides.

The heat exchanger fins 10 formed in this way are accumulated in a state where a predetermined number of the heat exchanger fins 10 are stacked in the thickness direction along guides G as depicted in FIG. 3.

First Embodiment

Figure 4:
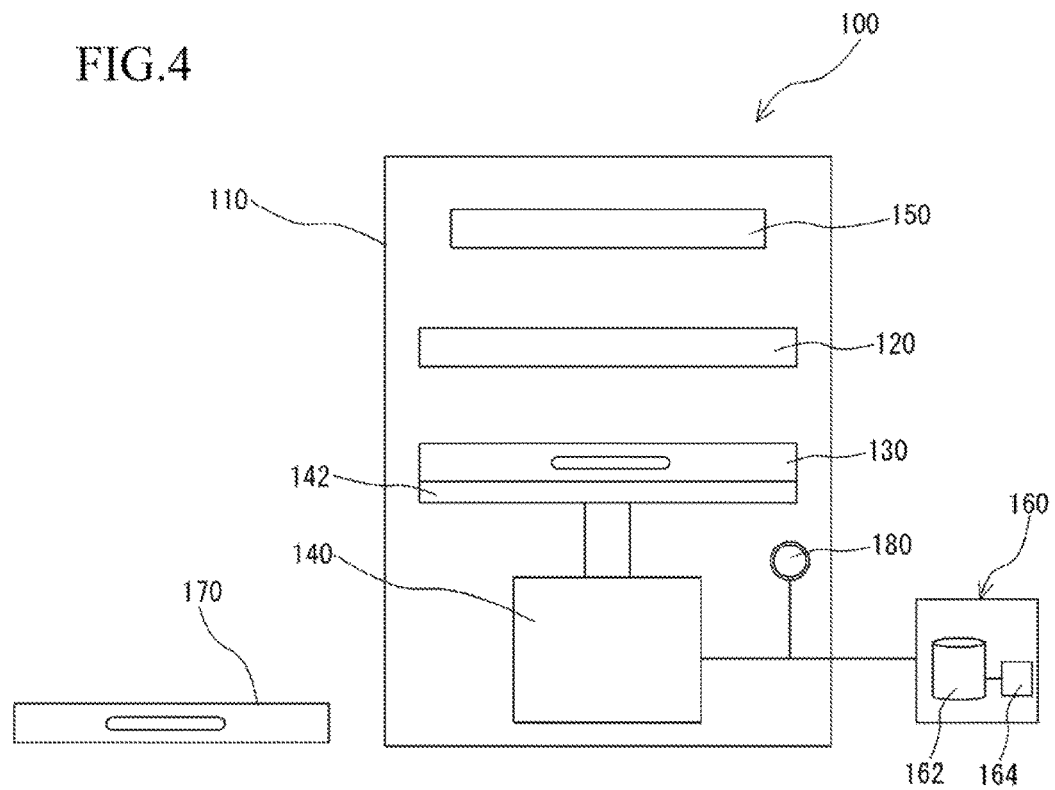
FIG. 4 is a diagram useful in explaining the overall configuration of an apparatus for inserting flattened tubes into heat exchanger fins according to the present embodiments.

The configuration of an apparatus 100 for inserting flattened tubes into heat exchanger fins according to the present embodiment will now be described with reference to FIGS. 4 to 7. As depicted in FIG. 4, the apparatus 100 for inserting flattened tubes into heat exchanger fins according to the present embodiment includes a main unit 110, a fin stack arranging unit 120, a flattened tube arranging unit 130, a flattened tube insertion driving unit 140, a platen 150, an operation control unit 160, and a flattened tube intermittently inserted fin stack arranging unit 170.

The main unit 110 according to the present embodiment is formed in a frame-like shape. The platen 150, the fin stack arranging unit 120, the flattened tube arranging unit 130, and the flattened tube insertion driving unit 140 are arranged in the main unit 110 in the stated order from the top. Both the fin stack arranging unit 120 and the flattened tube arranging unit 130 are formed in tray shapes and are exchangeably attached to the main unit 110.

By inserting the guides G into two of the cutaway portions 12 formed in the plurality of heat exchanger fins 10 that have been stacked in the thickness direction thereof, the fin stack arranging unit 120 according to the present embodiment arranges the plurality of heat exchanger fins 10 into a fin stack where a plurality of heat exchanger fins 10 are accumulated (i.e., stacked) in the thickness direction on the guides G. Since this fin stack can be supplied by an apparatus of the configuration disclosed by the present applicant in the International Patent Application (PCT/JP2015/053428), detailed description is omitted here.

Figure 5:
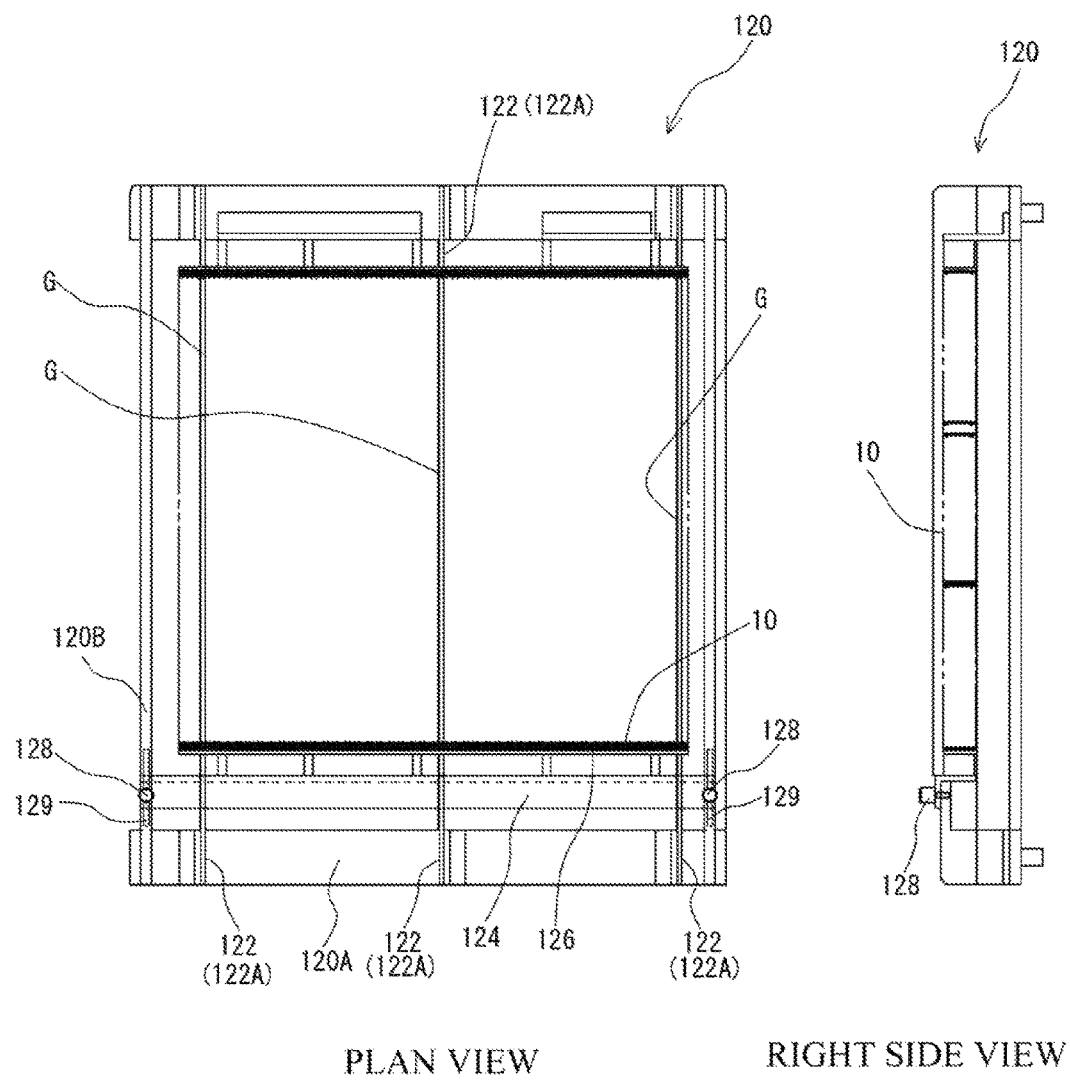
FIG. 5 is a plan view of a fin stack arranging unit.

As depicted in FIG. 5, the fin stack arranging unit 120 according to the present embodiment is formed in the shape of a rectangular frame when viewed from above and is detachably attached to the main unit 110 by being inserted into the main unit 110 from the front surface of the main unit 110. Guide insertion portions 122 into which the guides G are inserted are formed in a frame 120A that is perpendicular to the guides G and forms part of the outer frame of the fin stack arranging unit 120. It is also possible to dispose guide restricting portions 122A that restrict movement of the guides G at the guide insertion portions 122.

A compressing unit 124 that compresses the heat exchanger fins 10, which have been stacked in the thickness direction along the guide G, in the thickness direction is also disposed on the fin stack arranging unit 120 according to the present embodiment. The compressing unit 124 has a compressing plate 126 that contacts the plate-like portions 14 of the heat exchanger fins 10, is provided so as to be capable of sliding along a frame 120B of the fin stack arranging unit 120 that is parallel with the guides G, and is formed so as to be detachably attached by fasteners 128, such as screws, to the frame 120B of the fin stack arranging unit 120. Fastener concave portions 129 are formed in the upper surface of the frame 120B along the length direction of the frame 120B. It is also possible to use a configuration that applies pressure using a hydraulic cylinder in place of the fasteners 128. It is also possible to omit the configuration relating to the compressing unit 124.

By using a configuration where the fin stack arranging unit 120 includes the guide insertion portions 122 and the compressing unit 124 in this way, it is possible to set the fin stack in the main unit 110 in a state where the positions of the cutaway portions 12 of the heat exchanger fin 10 through which the guides G have been inserted have been aligned in the stacking direction. Doing so is favorable since it is possible to greatly reduce the risk of damage to the cutaway portions 12 when the flattened tubes T are later inserted into the cutaway portions 12.

Figure 6:
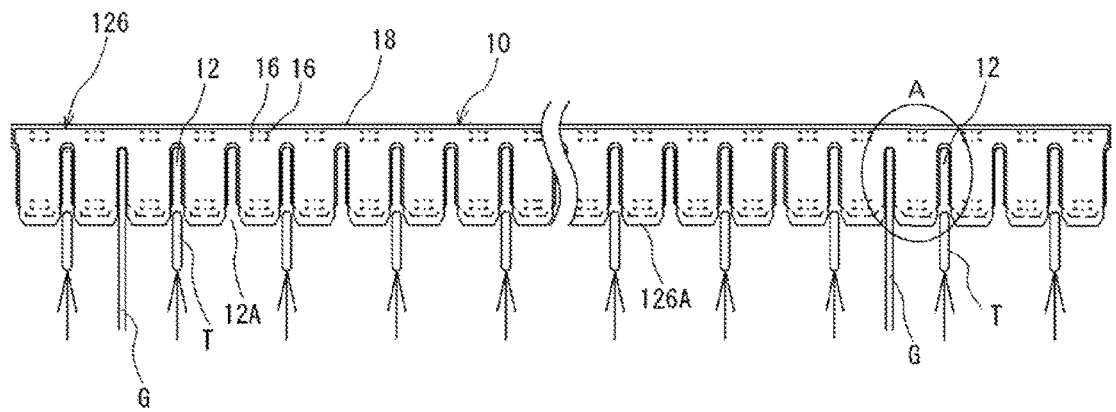
FIG. 6 is a diagram depicting a state where a compressing plate of a compressing unit is pressing the heat exchanger fins.

As depicted in FIG. 6, the compressing unit 124 in the present embodiment has the compressing plate 126 that is formed in a shape that follows the outline form of a contacted surface, i.e., the surface of a heat exchanger fin 10 that is perpendicular to the stacking direction, here the outline form of a heat exchanger fin 10 when looking from the front. The compressing plate 126 contacts the heat exchanger fins 10 across the entire range in the width direction in a front view of the heat exchanger fins 10 (i.e., in a direction that is on the same plane but perpendicular to the width direction of the heat exchanger fins 10). By using this compressing plate 126, it is possible, when pressing the heat exchanger fins 10 in the stacking direction using the compressing unit 124, to cause a uniform compressing force (pressing force) to act on a plane that is perpendicular to the compressing direction of the heat exchanger fins 10. Doing so is favorable since it is possible to prevent the occurrence of deformation in the out-of-plane direction of the heat exchanger fins 10 when the flattened tubes T are subsequently inserted into the cutaway portions 12.

Figure 7:
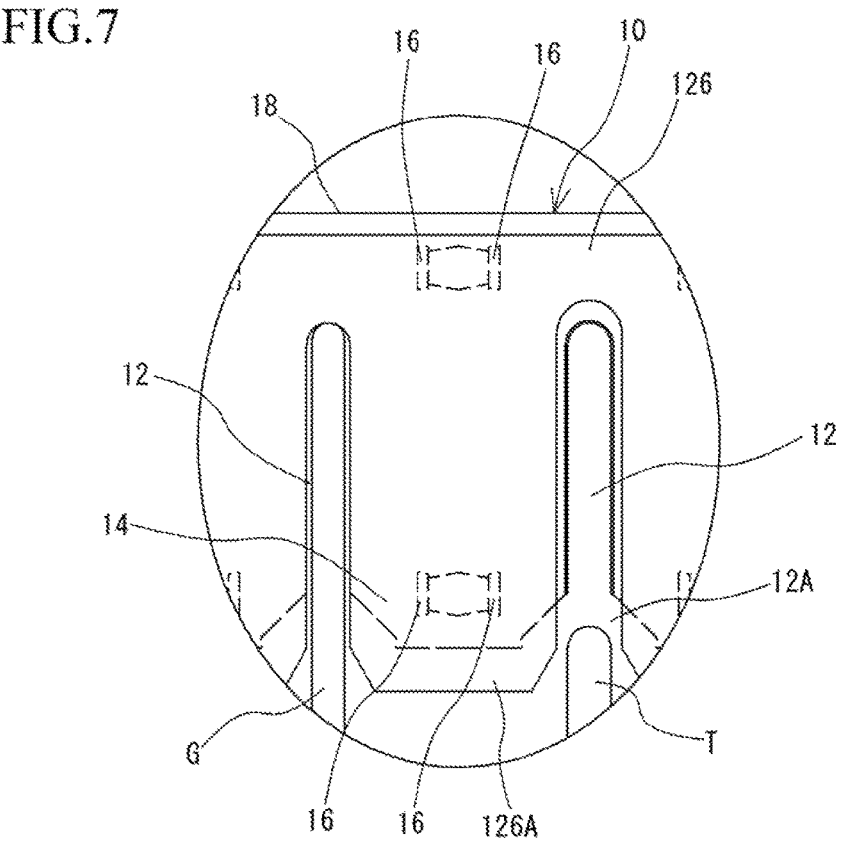
FIG. 7 is an enlargement of part A in FIG. 6.

Also, as depicted in FIG. 6 and FIG. 7, the compressing plate 126 in the present embodiment is formed so that lower end portions 126A of the compressing plate 126 protrude downward (outward) beyond the positions of the openings 12A of the cutaway portions 12 (the positions of the lower ends of the plate-like portions 14) of the heat exchanger fins 10. The compressing plate 126 is also formed with a thickness that is sufficiently thicker than the thickness of the heat exchanger fins 10. By having the lower end portions 126A of the compressing plate 126 protrude beyond the openings 12A in this way, the flattened tubes T will contact the compressing plate 126 before the openings 12A when the flattened tubes T are inserted into the cutaway portions 12. This is favorable because by doing so, it is possible to more reliably prevent damage to the openings 12A and deformation in the out-of-plane direction of the heat exchanger fins 10 when the flattened tubes T are inserted into the heat exchanger fins 10.

Figure 8:
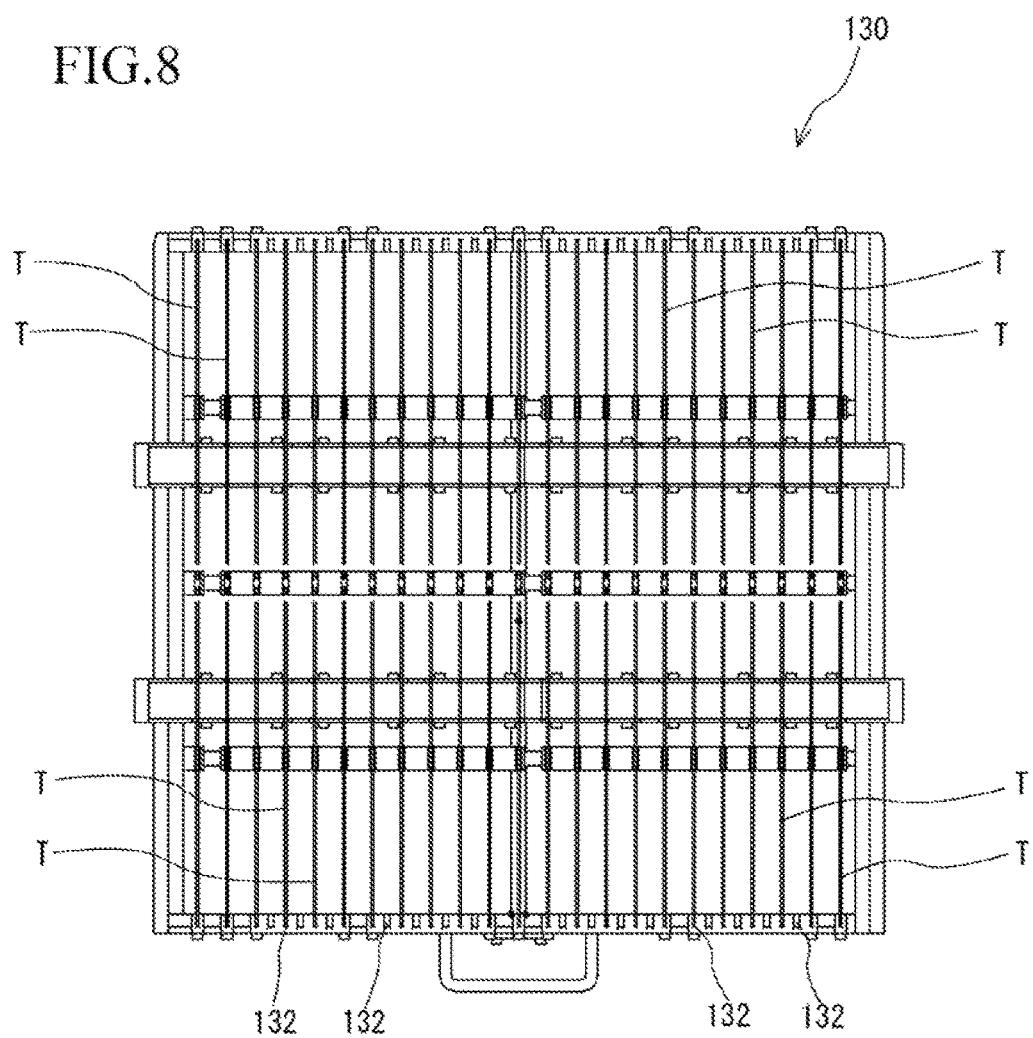
FIG. 8 is a diagram useful in explaining a flattened tube arranging unit.
Figure 8:
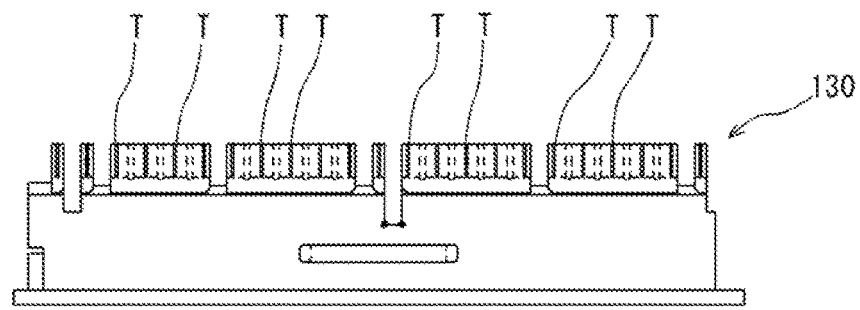

The flattened tube arranging unit 130, which arranges the flattened tubes T to be inserted into the cutaway portions 12 and as depicted in FIG. 8 is formed in the shape of a rectangular frame when viewed from above in the same way as the fin stack arranging unit 120, is disposed below the fin stack arranging unit 120 in the space inside the main unit 110. In the same way as the fin stack arranging unit 120, the flattened tube arranging unit 130 is formed so as to be detachably attached to the main unit 110 by being inserted inside the main unit 110 from the front surface of the main unit 110.

On the flattened tube arranging unit 130, flattened tubes T are disposed in an intermittent arrangement with respect to the cutaway portions 12, out of the cutaway portions 12 of the heat exchanger fins 10 that are arranged on the fin stack arranging unit 120 with the guides G inserted therethrough, aside from the cutaway portions 12 through which the guides G are inserted. The flattened tubes T are attached to the flattened tube arranging unit 130 by being inserted into flattened tube inserting portions 132.

The intermittent arrangement of flattened tubes T will now be described in detail. The cutaway portions 12 that are adjacently positioned on both sides of the cutaway portions 12 into which the guides G have been inserted are set as "standard cutaway portions 12", the positions of the cutaway portions 12 that are adjacent to the standard cutaway portions 12 are set as blanks (where flattened tubes T are not disposed), and flattened tubes T are disposed at cutaway portions 12 that are adjacent to the cutaway portions that are blank. The flattened tubes T are disposed on the flattened tube arranging unit 130 by repeatedly inserting and omitting the flattened tubes T for the plurality of cutaway portions 12 in this way.

By using a flattened tube arranging unit 130 of this configuration, it is possible to insert the flattened tubes T intermittently (i.e., in every other cutaway portion 12) into the plurality of cutaway portions 12 of the heat exchanger fin 10 that have been arranged together with the guides G on the fin stack arranging unit 120. By using this insertion pattern of flattened tubes T, it is possible to avoid deformation of the cutaway portions 12 due to deformation resistance of cutaway burring and external forces such as frictional forces that act upon the cutaway portions 12, and to miniaturize the flattened tube insertion driving unit 140 compared to a conventional example. It is also possible to reduce damage to and deformation of the cutaway portions 12 when the flattened tubes T are inserted into the cutaway portions 12 and to improve the yield.

The flattened tube insertion driving unit 140 is disposed below the flattened tube arranging unit 130 in the space inside the main unit 110. A servo motor that has a ball screw or the like coupled to the output shaft is favorably used as a driving source of the flattened tube insertion driving unit 140. By driving the servo motor that is the flattened tube insertion driving unit 140, it is possible to move a loading portion 142, on which the flattened tube arranging unit 130 has been loaded, toward and away from the fin stack arranging unit 120.

The stroke (or "driving stroke") by which the loading portion 142 is raised and lowered by the flattened tube insertion driving unit 140 is preferably set so as to be at least longer than the depth dimension of the cutaway portions 12. More specifically, the stroke by which the loading portion 142 is raised and lowered by the flattened tube insertion driving unit 140 is set so as to be at least equal to the sum of the distance between the lower end positions of the cutaway portions 12 disposed in the fin stack arranging unit 120 and the upper end portions of the flattened tubes T disposed on the flattened tube arranging unit 130 and at least the depth of the cutaway portions 12. Due to the flattened tube insertion driving unit 140 that has this driving stroke and the guide restricting portions 122A provided on the fin stack arranging unit 120, it is possible to construct a guide removing unit that removes the guides G, which are inserted through the cutaway portions 12 when the flattened tubes T are inserted into the cutaway portions 12, from the cutaway portions 12.

The flattened tube insertion driving unit 140 according to the present embodiment also changes the speed at which the flattened tube arranging unit 130 approaches the fin stack arranging unit 120 (i.e., the insertion speed of the flattened tubes T into the cutaway portions 12) in accordance with the inserted amount (i.e., the insertion depth position) of the flattened tubes T into the cutaway portions 12. More specifically, the insertion speed of the flattened tubes T in a range from the opening 12A side of the cutaway portions 12 to a depth position that is ⅔ of the entire depth of the cutaway portions 12 is set at a first insertion speed and the insertion speed of the flattened tubes T in a range from the position that is ⅔ of the entire depth of the cutaway portions 12 to the deepest part of the cutaway portions 12 is set at a second insertion speed that is lower than the first insertion speed. In addition, the second insertion speed according to the present embodiment is set so that the insertion speed gradually falls as the inserted depth of the flattened tubes T into the cutaway portions 12 increases from the ⅔ position of the entire depth of the cutaway portions 12 to the inner bottoms of the cutaway portions 12.

In this way, due to the flattened tube insertion driving unit 140 changing the insertion speed of the flattened tubes T into the cutaway portions 12 (that is, the speed at which the loading portion 142 is raised by the flattened tube insertion driving unit 140) in accordance with the insertion depth of the flattened tubes T into the cutaway portions 12, it is possible to suppress deformation of the cutaway portions 12 due to frictional forces that act on the cutaway portions 12 when the flattened tubes T are inserted, which is favorable in that it is possible to further raise the product yield.

This operation of the flattened tube insertion driving unit 140 is controlled by the operation control unit 160 that controls the operation of the apparatus 100 for inserting flattened tubes into the heat exchanger fins. As the operation control unit 160, it is possible to use a configuration with a storage unit 162 that stores an operation control program in which control commands for the respective operations are written and a CPU 164 that controls the operations of the various component elements of the apparatus 100 for inserting flattened tubes into heat exchanger fins based on the operation control program. This operation control unit 160 is capable of being integrated with an operation control unit (not illustrated) of the apparatus 100 for inserting flattened tubes into heat exchanger fins.

The platen 150 according to the present embodiment is formed so that at least the lower surface thereof is a flat surface and so as to be capable of contacting the outer edge of the joining portion 18 that is the other edge in the width direction of the heat exchanger fins 10 disposed in the fin stack arranging unit 120. This platen 150 is disposed in the main unit 110 in a state where the lower surface is parallel with the horizontal plane.

Figure 9:
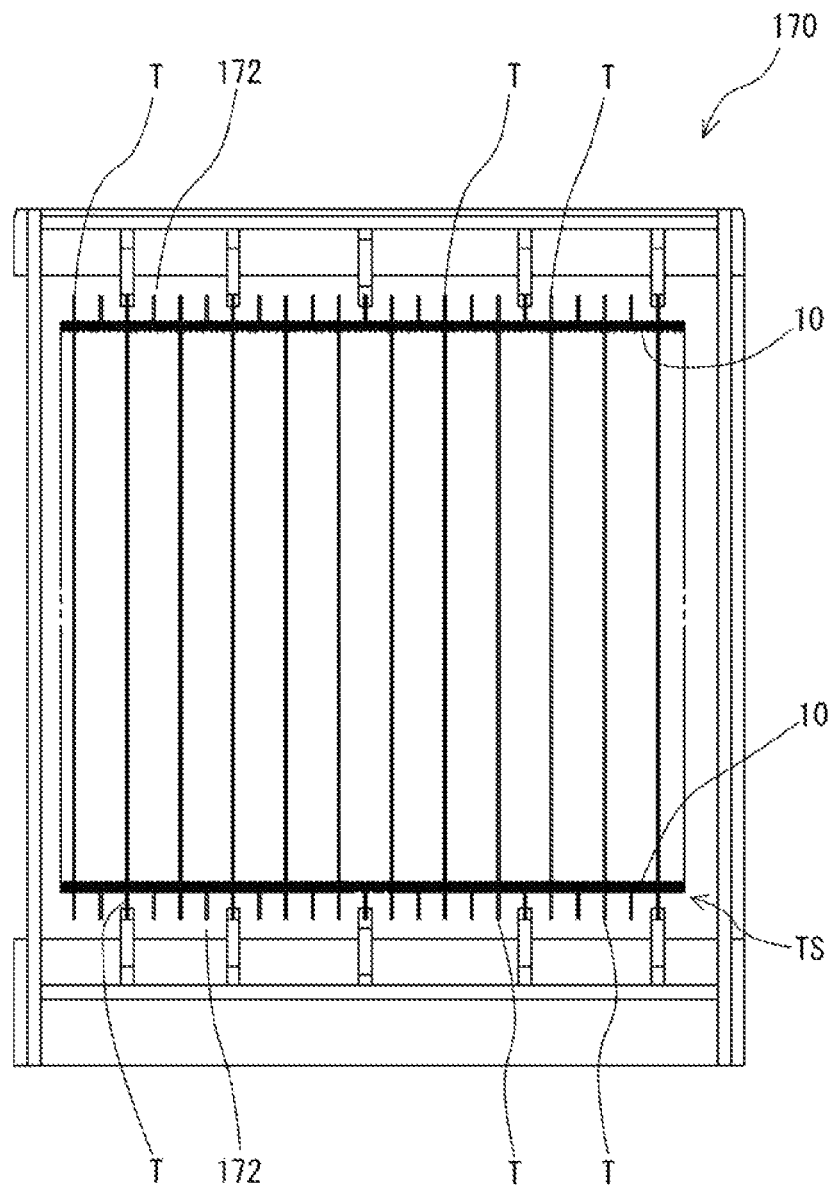
FIG. 9 is a plan view of a flattened tube intermittently inserted fin stack arranging unit.
Figure 10:
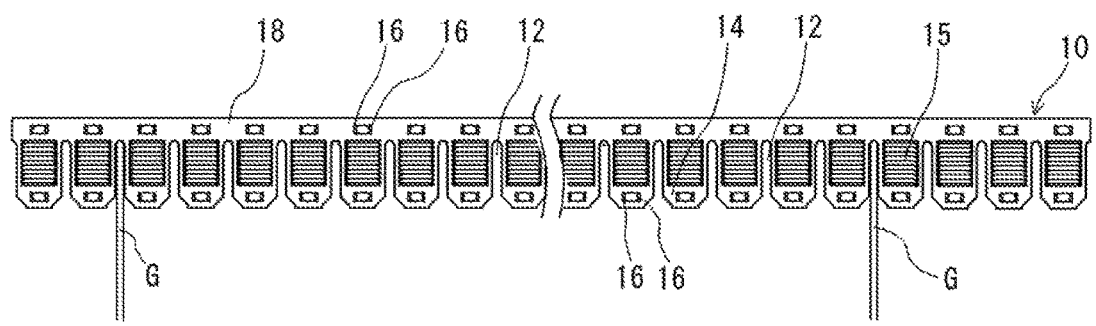
FIG. 10 is a diagram useful in explaining a state before insertion of flattened tubes into heat exchanger fins.
Figure 10:
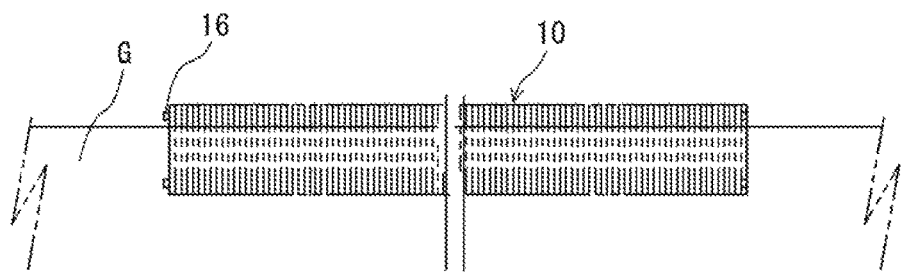

As depicted in FIG. 9, the flattened tube intermittently inserted fin stack arranging unit 170 has an external form that is the same shape as the fin stack arranging unit 120, and is used by being attached to the main unit 110 in place of the fin stack arranging unit 120. A flattened tube intermittently inserted fin stack TS, which has been produced by intermittently inserting flattened tubes T into the plurality of cutaway portions 12 of a structure integrally composed of the guides G and the heat exchanger fins 10 that are disposed on the fin stack arranging unit 120, is disposed in a positioned state on the flattened tube intermittently inserted fin stack arranging unit 170.

In more detail, in the flattened tube intermittently inserted fin stack TS, the planar positions of the cutaway portions 12 into which flattened tubes T have not been inserted are capable of being disposed so as to be aligned with the planar positions of the flattened tubes T disposed on the flattened tube arranging unit 130. More specifically, on a frame 170A, which is perpendicular to the disposed direction of the flattened tubes T, of the flattened tube intermittently inserted fin stack arranging unit 170, flattened tube intermittently inserted stack aligning portions 172 are disposed facing the positions of the cutaway portions 12. Here, concave holes that are concave when viewed from above are formed in the frame 170A as the flattened tube intermittently inserted stack aligning portions 172.

In this way, the flattened tube intermittently inserted fin stack arranging unit 170 arranges the flattened tube intermittently inserted fin stack TS in a state where the planar positions of the cutaway portions 12 in the fin stack set on the fin stack arranging unit 120 are shifted by one in the length direction of the heat exchanger fins 10. By using this flattened tube intermittently inserted fin stack arranging unit 170, during an insertion step that inserts the flattened tubes T into the cutaway portions 12, it is possible to use a flattened tube arranging unit 130 of the same shape, which makes it possible to contribute to a reduction in manufacturing cost through a reduction in components.

Next, the method of inserting the flattened tubes T into the heat exchanger fins 10 using the apparatus 100 for inserting flattened tubes into heat exchanger fins according to the present embodiment will be described. Here, unless indicated otherwise, it is assumed that the operation is performed by an operator.

First, as depicted in FIG. 5, a fin stack composed of the guides G and the heat exchanger fins 10 is set on the guide insertion portions 122 of the fin stack arranging unit 120. Next, the compressing unit 124 is attached to the frame 120B of the fin stack arranging unit 120 and the plurality of heat exchanger fins 10 in the fin stack are compressed in the length direction of the guides G (i.e., the direction in which the heat exchanger fins 10 are accumulated (stacked)) to maintain a state where the positions of the cutaway portions 12 in the length direction of the guides G are aligned. In this way, the fin stack arranging unit 120 on which the fin stack is set is attached inside the main unit 110 from the front surface of the main unit 110.

Figure 11:
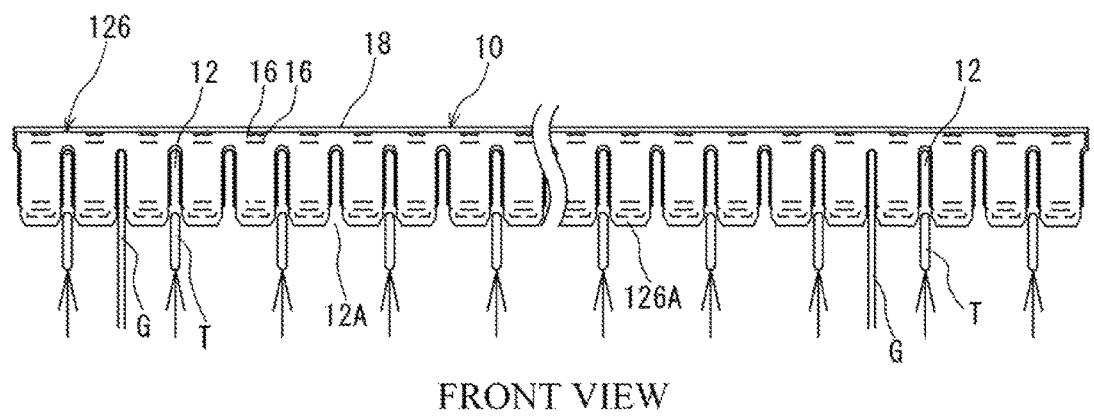
FIG. 11 is a diagram useful in explaining a state when a first group of flattened tubes are inserted into cutaway portions of heat exchanger fins.
Figure 11:
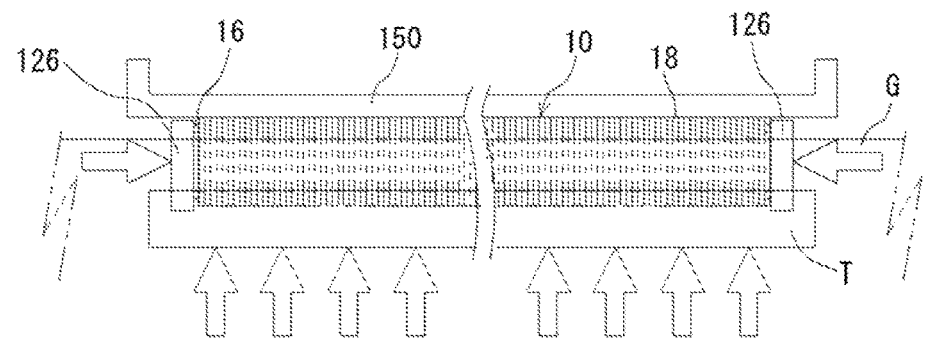

Next, as depicted in FIG. 8, the flattened tube arranging unit 130 where the flattened tubes T have been inserted into the flattened tube inserting portions 132 is attached as depicted in FIG. 4 from the front surface of the main unit 110 to a position that is inside the main unit 110 and is below the fin stack arranging unit 120 (a position faced by the open sides of the openings 12A). If, after the fin stack arranging unit 120 and the flattened tube arranging unit 130 have been attached to the main unit 110 in this way, a switch 180 disposed on the main unit 110 is operated, the flattened tube insertion driving unit 140 starts to operate. More specifically, as depicted in FIG. 11, the flattened tubes T set in the flattened tube arranging unit 130 advance from the opening 12A side (i.e., from below) of the cutaway portions 12 and by lifting the heat exchanger fins 10 upward so that the joining portions 18 come into contact with the platen 150, the flattened tubes T are inserted into the cutaway portions 12.

At this time, since movement of the guides G together with the heat exchanger fins 10 is restricted (i.e., prevented) by the guide restricting portions 122A, it is possible to use the operation that inserts the flattened tubes T into the heat exchanger fins 10 to separate the heat exchanger fins 10 and the guides G from the fin stack (i.e., to remove the guides G). Also, by forming the guides G so that the thickness is slightly narrower than the inner width of the cutaway portions 12, it is possible to smoothly separate the guides G from the heat exchanger fins 10.

Figure 16:
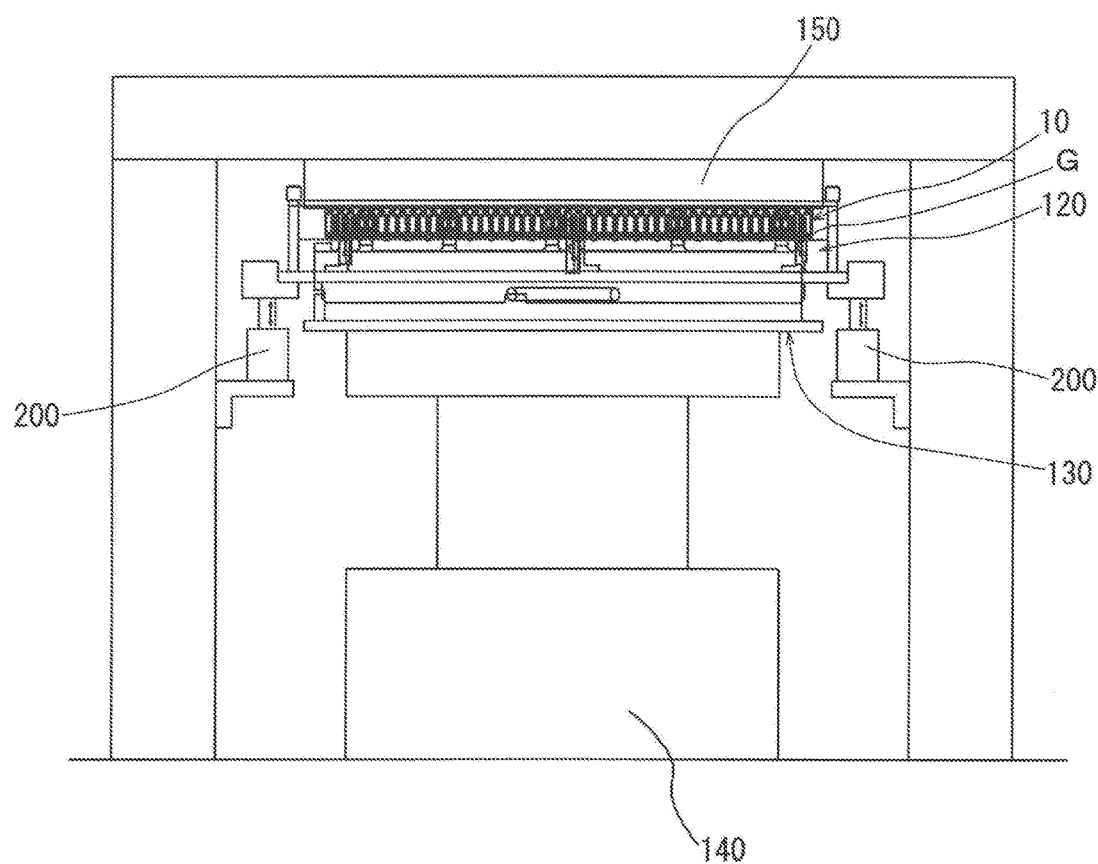
FIG. 16 is a diagram illustrating the guide unloader that is used as a guide removing unit.

As described earlier, the flattened tubes T are inserted into the cutaway portions 12 so that the extension speed of the flattened tube insertion driving unit 140 (which is the insertion speed of the flattened tubes T into the cutaway portions 12) uses two insertion speeds that are a first insertion speed and a second insertion speed that is lower than the first insertion speed and gradually falls (so that before long the insertion speed becomes zero). Aside from separating the guides G by restricting movement of the guides G with the guide restricting portions 122A, the guides G may be separated from the heat exchanger fins 10 by a guide unloader 200 used as a guide removing unit as depicted in FIG. 16. If the guides G are formed so that the thickness is slightly narrower than the inner width of the cutaway portions 12, it is possible to smoothly separate the guides G from the heat exchanger fins 10.

As described above, when the flattened tubes T are inserted into predetermined cutaway portions 12 of the heat exchanger fins 10 through which the guides G have been inserted (i.e., when a first insertion process that inserts the flattened tubes T into the cutaway portions 12 has been performed), the flattened tube insertion driving unit 140 retracts, the flattened tube arranging unit 130 is moved away from the fin stack arranging unit 120, and the fin stack arranging unit 120 and the flattened tube arranging unit 130 return to the original positions. At this time, a state is produced where the flattened tubes T are intermittently inserted into a plurality of the cutaway portions 12 of the heat exchanger fins 10 so as to resemble the teeth of a comb.

Next, the fin stack arranging unit 120 and the flattened tube arranging unit 130 are respectively pulled out from the main unit 110.

After this, the flattened tube intermittently inserted fin stack TS, where the flattened tubes T have been inserted in an intermittent arrangement into a plurality of the cutaway portions 12 of the heat exchanger fins 10, is removed from the fin stack arranging unit 120, and as depicted in FIG. 9, the flattened tube intermittently inserted fin stack TS is transferred to the flattened tube intermittently inserted fin stack arranging unit 170. The flattened tube intermittently inserted fin stack TS set on the flattened tube intermittently inserted fin stack arranging unit 170 is set in a state where the planar positions of the cutaway portions 12 are shifted by one compared to when the flattened tube intermittently inserted fin stack TS was set on the fin stack arranging unit 120. The flattened tube intermittently inserted fin stack arranging unit 170 is attached to the main unit 110 in place of the fin stack arranging unit 120 at the part of the main unit 110 where the fin stack arranging unit 120 was housed.

After this, a flattened tube arranging unit 130 where flattened tubes T are disposed with the same conditions as the flattened tube arranging unit 130 depicted in FIG. 8 that was used when forming the flattened tube intermittently inserted fin stack TS is prepared. This second flattened tube arranging unit 130 is then set at the same position as the flattened tube arranging unit 130 that was used previously.

By setting the flattened tube intermittently inserted fin stack arranging unit 170 and the flattened tube arranging unit 130 on the main unit 110 in this way, it is possible to align the planar positions of the cutaway portions 12 in the flattened tube intermittently inserted fin stack TS into which flattened tubes T have not been inserted and the flattened tubes T set on the flattened tube arranging unit 130.

Figure 12:
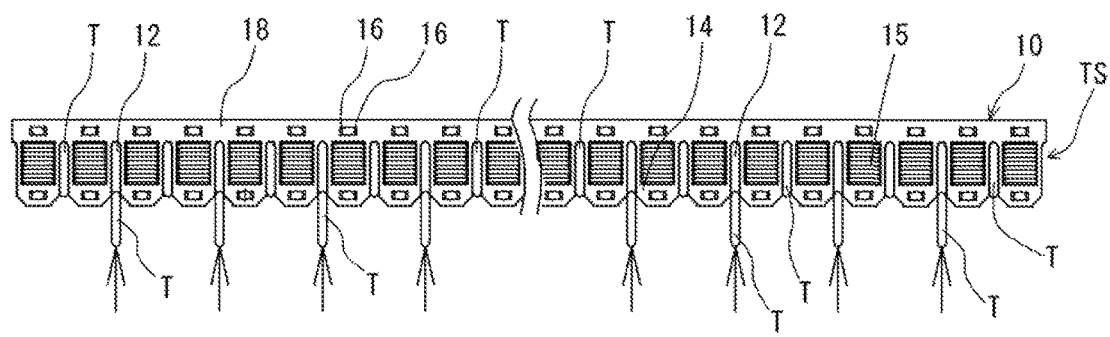
FIG. 12 is a diagram useful in explaining a state when a second group of flattened tubes are inserted into cutaway portions of the heat exchanger fins.
Figure 12:
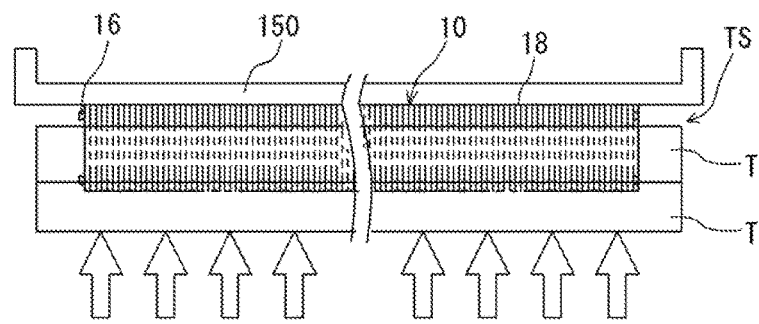

Next, by operating the switch 180, it is possible to insert flattened tubes T into the cutaway portions 12 that are the insertion targets as depicted in FIG. 12 using the same insertion operation for flattened tubes T into the cutaway portions 12 as the first operation. By inserting the flattened tubes T into a plurality of cutaway portions 12 formed in the heat exchanger fins 10 in this way in two insertion operations, it is possible to reduce the external forces, as represented by frictional forces, which act when the flattened tubes T are inserted into the cutaway portions 12. By doing so, it is possible to miniaturize the flattened tube insertion driving unit 140 and to prevent damage to the cutaway portions 12.

Note that as depicted in FIG. 12, since flattened tubes T are already inserted into other cutaway portions 12 when flattened tubes T are inserted into the cutaway portions 12 the second time, there will be no risk of out-of-plane deformation of the heat exchanger fins 10 even if the compressing unit 124 is not used. Note that although not illustrated, when flattened tubes T are inserted into the cutaway portions 12 the second time, it is also possible to use the compressing unit 124 in the same way as when flattened tubes T are inserted into the cutaway portions 12 the first time.

With the operation described above, it is possible to obtain a pre-assembly for a heat exchanger core where flattened tubes T have been inserted into all of the cutaway portions 12 formed in the heat exchanger fins 10. By attaching a header, not illustrated, to the heat exchanger core pre-assembly after the heat exchanger core pre-assembly has been removed from the flattened tube intermittently inserted fin stack arranging unit 170, it is possible to obtain a heat exchanger core.

Second Embodiment

Figure 13:
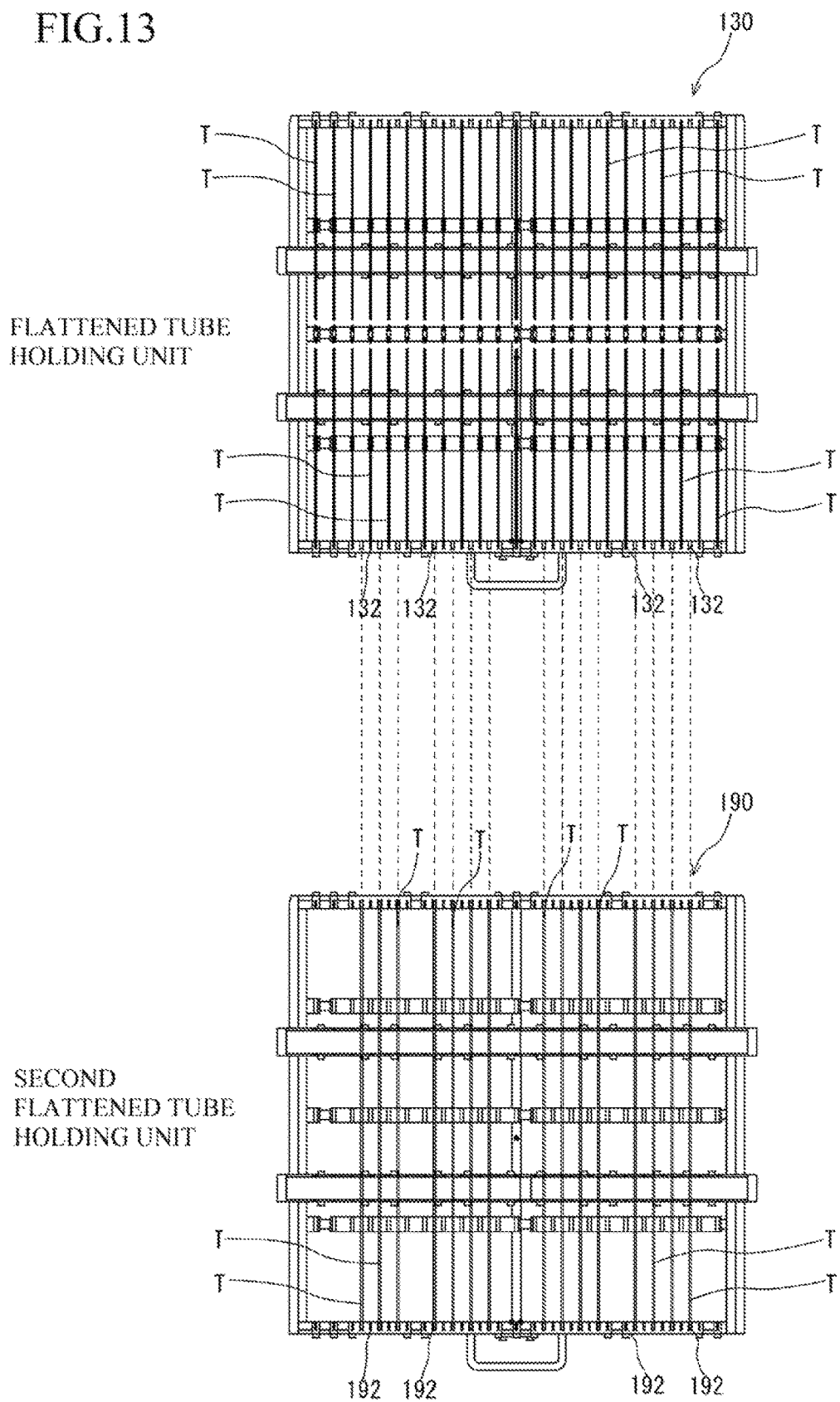
FIG. 13 is a plan view useful in comparing a flattened tube holding unit and a second flattened tube holding unit.
Figure 14:
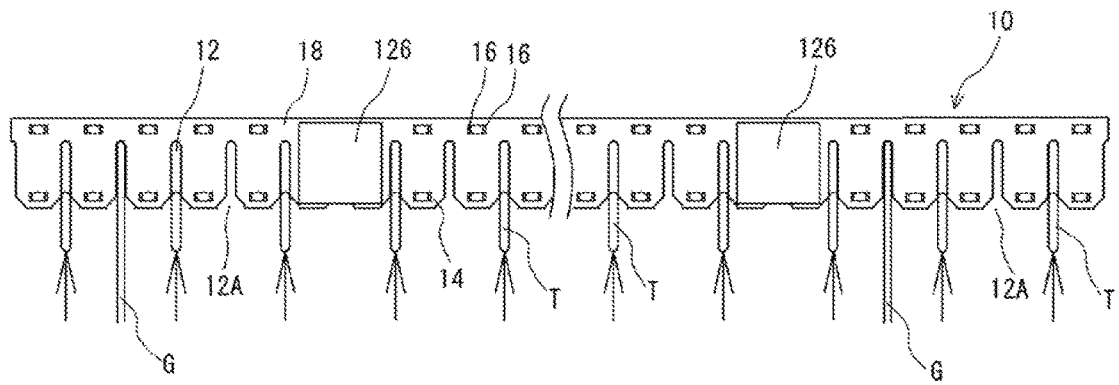
FIG. 14 is a diagram useful in explaining a state where a compressing plate according to the related art is pressed onto heat exchanger fins.
Figure 15:
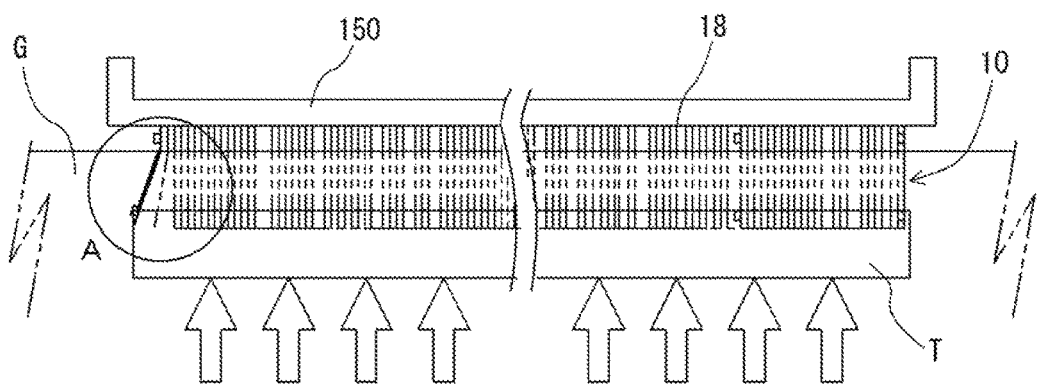
FIG. 15 is a diagram useful in explaining a state when flattened tubes are inserted into cutaway portions in the state depicted in FIG. 14.
Figure 15:
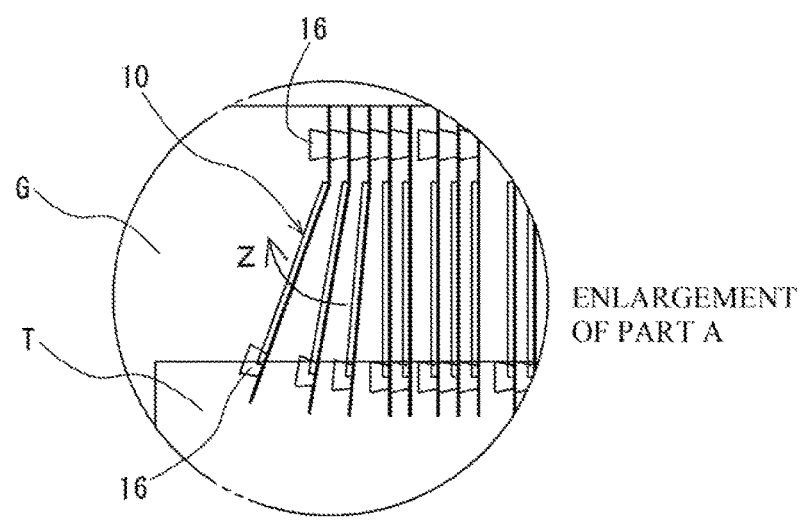

The first embodiment describes a configuration where the flattened tube intermittently inserted fin stack arranging unit 170 is used when positioning the cutaway portions 12 of the flattened tube intermittently inserted fin stack TS that are the insertion targets for flattened tubes T in the second insertion operation. On the other hand, the present embodiment describes a configuration where the state where the flattened tube intermittently inserted fin stack TS is disposed on the fin stack arranging unit 120 is maintained even when flattened tubes T are inserted into the cutaway portions 12 of the flattened tube intermittently inserted fin stack TS in the second insertion operation, and the flattened tubes T are inserted in the second operation using a second flattened tube arranging unit 190. FIG. 13 is a plan view useful in comparing the flattened tube arranging unit and the second flattened tube arranging unit.

As depicted in FIG. 13, the second flattened tube arranging unit 190 is formed with the same external shape as the flattened tube arranging unit 130. Flattened tube inserting portions 192 of the second flattened tube arranging unit 190 are formed with planar positions corresponding to cutaway portions 12 aside from the positions where flattened tubes T were attached to the cutaway portions 12 of the heat exchanger fins 10 using the flattened tube arranging unit 130. By using the second flattened tube arranging unit 190 of this configuration, it is possible to omit the step of transferring the flattened tube intermittently inserted fin stack TS using the flattened tube intermittently inserted fin stack arranging unit 170 as in the first embodiment.

Since the method of inserting the flattened tubes T into the heat exchanger fins 10 according to the present embodiment can be implemented in the same way as the steps until the flattened tube intermittently inserted fin stack TS is obtained and the steps after the heat exchanger core pre-assembly has been obtained in the same way as the first embodiment, detailed description of these steps is omitted here.

After the flattened tubes T have been inserted into a plurality of cutaway portions 12 of the heat exchanger fins 10 in the first insertion operation to form the flattened tube intermittently inserted fin stack TS, the flattened tube arranging unit 130 is pulled out from the main unit 110. Next, the second flattened tube arranging unit 190 is set in the main unit 110 in place of the flattened tube arranging unit 130. After this, once the switch 180 has been operated, the flattened tube insertion driving unit 140 operates in the same way as the first insertion operation for the flattened tubes T, which makes it possible to insert flattened tubes T into the cutaway portions 12 in the flattened tube intermittently inserted fin stack TS into which flattened tubes T have not yet been inserted.

When performing the process that inserts the flattened tubes T into the cutaway portions 12 in the flattened tube intermittently inserted fin stack TS (i.e., the second process that inserts flattened tubes T into the cutaway portions 12 of the heat exchanger fins 10), one of the following methods is used. That is, inside the main unit 110, one of the following methods is selected as appropriate.

(First method) The planar positions of the cutaway portions 12 into which flattened tubes T are yet to be inserted are shifted by a pitch of one on the flattened tube intermittently inserted fin stack TS side.

(Second method) The planar arranged positions of the flattened tubes T arranged on the flattened tube arranging unit 130 are shifted by one pitch of the cutaway portions 12 into which the flattened tubes T are to be inserted between the first insertion operation and the second insertion operation.

Although the present invention has been described by way of the embodiments given above, the present invention is not limited to the above embodiments and it should be obvious that various modifications may be implemented without departing from the spirit of the invention. As one example, although the flattened tube arranging unit 130 and the second flattened tube arranging unit 190 are caused to approach the fin stack arranging unit 120 or the flattened tube intermittently inserted fin stack arranging unit 170 when the flattened tubes T are inserted into the cutaway portions 12 of the heat exchanger fins 10 in the above embodiments, the present invention is not limited to this configuration. It is also possible to use an arrangement where one element approaches the other or both elements approach each other.

Also, although arrangements where the flattened tube arranging unit 130 and the second flattened tube arranging unit 190 are disposed at positions below the fin stack arranging unit 120 in the space inside the main unit 110 have been described in the embodiments above, this is because the openings 12A in the width direction of the heat exchanger fins 10 arranged on the fin stack arranging unit 120 face downward in such arrangements. If the openings 12A in the width direction of the cutaway portions 12 of the heat exchanger fins 10 disposed on the fin stack arranging unit 120 face sideways, it is possible to use an arrangement where the platen 150 and the flattened tube arranging unit 130 and second flattened tube arranging unit 190 are disposed on the sides of the fin stack arranging unit 120.

Also, although a configuration where the thickness of the compressing plate 126 of the compressing unit 124 is formed sufficiently thicker than the thickness of the heat exchanger fins 10, the present invention is not limited to this embodiment. Since it is sufficient, when the flattened tubes T are inserted into the cutaway portions 12, for there to be no large deformation of the compressing plate 126 when the flattened tubes T contact the compressing plate 126, provided that the compressing plate 126 is formed of a more rigid (mechanically strong) material than the heat exchanger fins 10, there are no particular limitations on the thickness of the compressing plate 126.

Also, although the insertion speed of the flattened tubes T into the cutaway portions 12 is classified into two types in the present embodiment, the number of speeds into which the insertion speed of the flattened tubes T into the cutaway portions 12 may be divided is not limited to two. The position at which the insertion speed of the flattened tubes T into the cutaway portions 12 is changed from the first insertion speed to the second insertion speed is also not limited to a ⅔ position in the depth direction of the cutaway portions 12. The insertion speed of the flattened tubes T into the cutaway portions 12 may be classified into three or more types or the insertion speed may be continuously reduced from the start of insertion of the flattened tubes T into the cutaway portions 12 until insertion is completed. In addition, when the insertion speed of flattened tubes T into the cutaway portions 12 is changed in stages, it is possible to appropriately change the insertion depth position of the flattened tubes T into the cutaway portions 12 at which the insertion speed is changed.

Also, although configurations where the lower surface of the platen 150 is formed as a flat surface have been described, concave portions (not illustrated) into which the joining portion 18 sides of the heat exchanger fins 10 can be inserted may be formed in the lower surface of the platen 150. By providing these concave portions, it is possible to prevent buckling of the heat exchanger fins 10 when the flattened tubes T are inserted into the cutaway portions 12, which makes it possible to raise the product yield.

In addition, it is possible to configure an apparatus 100 for inserting flattened tubes into heat exchanger fins that is an appropriate combination of the configurations described above.

What is claimed is:

1. An apparatus for inserting flattened tubes into heat exchanger fins comprising:
   a fin stack arranging unit that arranges a fin stack composed by stacking a plurality of heat exchanger fins in a stacking direction, in which a plurality of cutaway portions are formed in a length direction by cutting away from one side in a width direction of the heat exchanger fins toward another side, in a thickness direction of the heat exchanger fins;
   a guide inserted into at least one of a predetermined, respective cutaway portion in each of the plurality of heat exchanger fins, said guide extends in the stacking direction so as to pass through the at least one of the predetermined, respective cutaway portion of each of the plurality of heat exchanger fins and protrudes out of the at least one of the predetermined, respective cutaway portion aligned in the length direction;
   a flattened tube arranging unit that has a plurality of flattened tubes disposed in an intermittent arrangement with respect to corresponding ones of the plurality of the cutaway portions into which the guide has not been inserted and that is disposed on a side in the width direction of the heat exchanger fins where the plurality of cutaway portions are open;
   a flattened tube insertion driving unit that causes respective ones of the plurality of flattened tubes and respective corresponding ones of the plurality of cutaway portions to relatively approach one another so that the respective ones of the plurality of flattened tubes are individually, respectively inserted into the corresponding ones of the plurality of cutaway portions;
   a platen that contacts another edge in the width direction of the heat exchanger fins when the respective ones of the plurality of flattened tubes are individually inserted into the respective corresponding ones of the plurality of cutaway portions;
   a heat exchanger fin compressing unit including a compressing plate which comes into contact, on a plane that is perpendicular to the stacking direction of the plurality of heat exchanger fins, with the plurality of heat exchanger fins positioned at both ends in a stacking direction of the plurality of heat exchanger fins across an entire range in a direction on a same plane as and perpendicular to the width direction of the plurality of heat exchanger fins, and a compressing means for compressing the plurality of heat exchanger fins in the stacking direction using the pressing plate;
   a guide removing unit that removes the guide from the fin stack; and
   a flattened tube intermittently inserted fin stack arranging unit that arranges, in a flattened tube intermittently inserted fin stack that has been produced by the respective ones of the plurality of flattened tubes disposed in the fin stack arranging unit being individually inserted into each of the respective corresponding ones of the plurality of cutaway portions, the positions of the plurality of cutaway portions into which the plurality of flattened tubes have not been inserted so as to be aligned with positions of the plurality of flattened tubes disposed in the flattened tube arranging unit, and is used in place of the flattened tube arranging unit.

2. The apparatus for inserting flattened tubes into heat exchanger fins according to claim 1,
   wherein the compressing plate is formed in a shape that follows an outline of a contacted surface that contacts the plurality of heat exchanger fins, and
   end positions of the compressing plate on one side in the width direction of the plurality of heat exchanger fins protrude beyond positions of openings of the cutaway portions.

3. An apparatus for inserting flattened tubes into heat exchanger fins comprising:
   a fin stack arranging unit that arranges a fin stack composed by stacking a plurality of heat exchanger fins in a stacking direction, in which a plurality of cutaway portions are formed in a length direction by cutting away from one side in a width direction of the heat exchanger fins toward another side, in a thickness direction of the heat exchanger fins;
   a guide inserted into at least one of a predetermined, respective cutaway portion in each of the plurality of heat exchanger fins, said guide extends in the stacking direction so as to pass through the at least one of the predetermined, respective cutaway portion of each of the plurality of heat exchanger fins and protrudes out of the at least one of the predetermined, respective cutaway portion aligned in the length direction;

a flattened tube arranging unit that has a plurality of flattened tubes disposed in an intermittent arrangement with respect to corresponding ones of the plurality of the cutaway portions into which the guide has not been inserted and that is disposed on a side in the width direction of the heat exchanger fins where the plurality of cutaway portions are open;

a flattened tube insertion driving unit that causes respective ones of the plurality of flattened tubes and respective corresponding ones of the plurality of cutaway portions to relatively approach one another so that the respective ones of the plurality of flattened tubes are individually, respectively inserted into the corresponding ones of the plurality of cutaway portions;

a platen that contacts another edge in the width direction of the plurality of heat exchanger fins when the respective ones of the plurality of flattened tubes are individually inserted into the respective corresponding ones of the plurality of cutaway portions;

a heat exchanger fin compressing unit including a compressing plate which comes into contact, on a plane that is perpendicular to the stacking direction of the plurality of heat exchanger fins, with the plurality of heat exchanger fins positioned at both ends in a stacking direction of the plurality of heat exchanger fins across an entire range in a direction on a same plane as and perpendicular to the width direction of the plurality of heat exchanger fins, and a compressing means for compressing the plurality of heat exchanger fins in the stacking direction using the pressing plate;

a guide removing unit that removes the guide from the fin stack; and a second flattened tube arranging unit that arranges, for a flattened tube intermittently inserted fin stack that is disposed on the fin stack arranging unit and has been produced by the flattened tube arranging unit, the flattened tube insertion driving unit, the compressing plate, and the guide removing unit intermittently individually inserting each of the plurality of flattened tubes into each of the respective corresponding ones of the plurality of cutaway portions of the fin stack, new flattened tubes in an arrangement corresponding to positions of the plurality of cutaway portions into which the plurality of flattened tubes have not been inserted and that is used in place of the flattened tube arranging unit.

4. The apparatus for inserting flattened tubes into heat exchanger fins according to claim 3, wherein the compressing plate is formed in a shape that follows an outline of a contacted surface that contacts the plurality of heat exchanger fins, and end positions of the compressing plate on one side in the width direction of the plurality of heat exchanger fins protrude beyond positions of openings of the cutaway portions.

* * * * *